United States Patent
Dudar et al.

(10) Patent No.: US 9,823,166 B2
(45) Date of Patent: Nov. 21, 2017

(54) COORDINATED TESTING IN VEHICLE PLATOONS

(71) Applicant: Ford Global Technologies, LLC, Dearborn, MI (US)

(72) Inventors: Aed M. Dudar, Canton, MI (US); Imad Hassan Makki, Dearborn Heights, MI (US); Fling Tseng, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/932,077

(22) Filed: Nov. 4, 2015

(65) Prior Publication Data
US 2017/0122841 A1    May 4, 2017

(51) Int. Cl.
*G01M 17/00* (2006.01)
*G07C 5/08* (2006.01)
*B60W 40/02* (2006.01)

(52) U.S. Cl.
CPC ............ *G01M 17/00* (2013.01); *B60W 40/02* (2013.01); *G07C 5/0808* (2013.01); *B60W 2550/12* (2013.01); *B60W 2550/13* (2013.01); *B60W 2550/408* (2013.01)

(58) Field of Classification Search
CPC .... G01M 17/00; G07C 5/0808; B60W 40/02; B60W 2550/12; B60W 2550/13; B60W 2550/408
See application file for complete search history.

(56) References Cited

U.S. PATENT DOCUMENTS

| | | | |
|---|---|---|---|
| 6,128,559 A | 10/2000 | Saitou et al. | |
| 6,505,106 B1 | 1/2003 | Lawrence et al. | |
| 8,620,714 B2 | 12/2013 | Williams et al. | |
| 8,744,666 B2 | 6/2014 | Switkes et al. | |
| 2010/0256852 A1* | 10/2010 | Mudalige | G08G 1/163 701/24 |
| 2013/0211624 A1 | 8/2013 | Lind et al. | |
| 2015/0100192 A1 | 4/2015 | Lee et al. | |
| 2015/0206360 A1 | 7/2015 | Schnurr et al. | |

FOREIGN PATENT DOCUMENTS

JP    2639163    4/1997

OTHER PUBLICATIONS

UK Search Report dated Apr. 26, 2017 (3 pages).

* cited by examiner

*Primary Examiner* — Mussa A Shaawat
*Assistant Examiner* — Michael Kerrigan
(74) *Attorney, Agent, or Firm* — Frank A. MacKenzie; Bejin Bieneman PLC

(57) ABSTRACT

A vehicle computer is communicatively coupled to a portable computing device and is programmed to determine, in a lead vehicle, that one or more conditions for a diagnostic test, such as an onboard diagnostic (OBD) test, are met and to send a vehicle-to-vehicle message to one or more following vehicles at a specified time. The sent message provides data to indicate to each following vehicle to perform the test at a specified time. The vehicle computer is further programmed to perform the test in the lead vehicle at the specified time.

20 Claims, 2 Drawing Sheets

COORDINATED TESTING IN VEHICLE PLATOONS

BACKGROUND

On-board diagnostic (OBD) tests analyze vehicle operations and may identify problems with vehicle components. OBD tests may be delayed and/or performed sparingly, however, because performing the OBD tests often depends on satisfying prerequisite (sometimes referred to as entry) conditions before and/or during a the test. Examples of OBD tests include an evaporative emissions control (EVAP) test, an exhaust gas recirculation (EGR) test, an oxygen sensor test, a heated catalyst test, to name a few. Examples of entry conditions include fuel volume between 15% and 85% of capacity, ambient temperature from 40° Fahrenheit to 95° Fahrenheit, altitude less than 8500 feet, vehicle speed greater than 25 miles per hour, etc.

DRAWINGS

DETAILED DESCRIPTION

Overview

Figure 1:
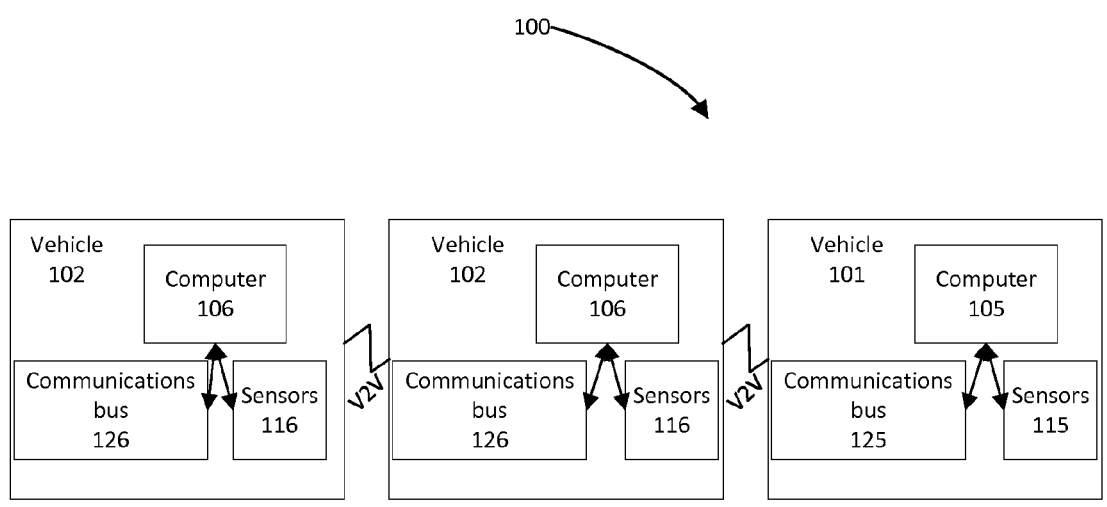
FIG. 1 illustrates an example system for OBD testing in a vehicle platoon.

FIG. 1 is a block diagram of an example multi-vehicle testing system, i.e., for a platoon including a lead vehicle 101 and following vehicles 102. Although tests described in the examples herein are onboard diagnostics (OBD) system tests, the disclosed subject matter could be practiced in the context of testing other vehicle 101, 102 systems and/or elements. In general, the principles illustrated herein could apply in any context in which vehicles 101, 102 operate in a platoon, and in which a lead vehicle 101 computer 105 could determine whether test conditions are met for one or more following vehicles 102. In any such context, the computer 105 could cause a message to be sent to one or more following vehicle 102 computers 106 including instructions to initiate a test or tests, such instructions supplementing and/or overriding programming in the computer 106 that governs execution of the test or tests.

A vehicle 101 includes a computer 105 that includes or is communicatively coupled to the vehicle 101 communication bus 125 such as is known to provide communications to and from vehicle 101 components and/or electronic control units 110, e.g., controllers for vehicle 101 steering, braking, throttling, etc. The computer 105 may receive data relating to operating the vehicle 101. The computer 105 is typically communicatively coupled with a network 130, via which the computer 105 may communicate with a server 140, which in turn is communicatively coupled to a data store 145.

The vehicle 101 is lead vehicle in a platoon of vehicles that includes surrounding, typically following, vehicles 102. The vehicles 101, 102 may communicate, e.g. via vehicle-to-vehicle (V2V) communications such as Dedicated Short-Range Communications (DSRC), etc. The lead vehicle 101 may provide various instructions to the following vehicles 102, e.g., concerning speed, acceleration, braking, steering etc. The vehicles 101, 102 may or may not be occupied by human operators. In other words, the vehicles 101, 102 may form a platoon and operate according to various known systems for vehicle platooning.

Further, the vehicles 101, 102 when traveling together, e.g., on a roadway in a platoon may coordinate OBD tests. For example, the vehicle 101 computer 105 may determine when one or more prerequisite conditions, e.g., what are sometimes referred to as "entry" conditions, are met in the lead vehicle 101 for an OBD test (or tests) in the vehicle 101 and/or vehicles 102, whereupon the vehicle 101 may initiate the OBD test in the vehicle 101 and may send a message to following vehicles 102 to execute the test(s). The message may specify a time and/or location (e.g., specific global positioning system coordinates) at which the test is to be performed in each of the vehicles 101, 102, thereby synchronizing the tests. Further, a computer 106 in a vehicle 102 may be programmed to perform one or more tests upon receiving such a message from the vehicle 101, even where prerequisite conditions are not met in the vehicle 102, and/or according to modified prerequisite conditions in the vehicle 102, i.e., a vehicle 102 may employ prerequisite conditions for a test that are modified based on reliance upon a message form the lead vehicle 101.

Advantageously, therefore, the vehicles 101, 102 may more often and more efficiently conduct OBD testing. A risk of having to abort an OBD test due to changing and/or unforeseen conditions is reduced.

Example System Elements

The vehicle 101 computer 105, which includes a processor and a memory as is known, may be communicatively coupled to, e.g., via a communications bus 125 or other known wired or wireless connections, or the computer 105 may include, one or more electronic control units, e.g., controllers or the like included in the vehicle 101 for monitoring and/or controlling various vehicle 101 components, e.g., an engine control unit (ECU), transmission control unit (TCU), etc. The bus 125 may be a controller area network (CAN) bus and/or any other suitable in-vehicle communications bus such as JASPAR, LIN, SAE J1850, AUTOSAR, MOST, etc. Electronic control units may be connected to, e.g., the CAN bus, as is known. The vehicle 101 may also include one or more electronic control units specifically for receiving and transmitting diagnostic information such as an onboard diagnostics connector (OBD-II). Via the CAN bus, OBD-II, and/or other wired or wireless mechanisms, the computer 105 may transmit messages to various devices in the vehicle 101 and/or receive messages from the various devices, e.g., controllers, actuators, etc. Alternatively or additionally, in cases where the computer 105 actually comprises multiple devices, the CAN bus or the like may be used for communications between devices represented as the computer 105 in this disclosure, e.g., various ECUs.

The computer 105 may transmit and/or receive messages using a plurality of communication protocols, e.g., the computer 105 may include and/or be communicatively coupled to one or more transceivers as are known for providing such communications. For example, the computer 105 may transmit and/or receive messages using vehicle-to-vehicle protocols such as Dedicated Short Range Communication (DSRC), cellular modem, and short-range radio frequency.

Further, the computer 105 typically includes and/or is communicatively coupled to, an OBD controller such as is known for accessing OBD as well as determining when prerequisite conditions are met for various OBD tests, and conducting such tests.

The vehicle 101 may include a variety of sensors 115. The sensors 115 may be linked to electronic control units and operate within a CAN bus protocol or any other suitable protocol, as described above. The sensors 115 may both transmit and receive data. The sensors 115 may communicate with the computer 105 or other electronic control unit via e.g., the CAN bus protocol, to process information transmitted from or received by the sensors 115. The sensors 115 may communicate with the computer 105 or other electronic control unit via any suitable wireless and/or wired manner. The sensors 115 may include any assortment of a camera, a RADAR unit, a LADAR unit, a sonar unit, a breathalyzer, a motion detector, etc. Additionally, the sensors 115 may include a global positioning system (GPS) receiver that may communicate with a global positioning system satellite. The sensors 115 may measure values relating to operation of the vehicle 101 and of the surrounding vehicles and environment. For example, the sensors 115 may measure the speed and location of the vehicle 101, a speed and location of surrounding vehicles 106 relative to the vehicle 101, and/or values relating to prerequisite conditions for the one or more OBD tests, e.g., altitude, speed, fuel volume, acceleration, temperature, etc.

Each of the vehicles 102 typically includes a computer 106, sensors 116, and a communications bus 126. Each of the elements 106, 116, and 126 is similar to the elements 105, 115, and 125 in the vehicle 101, and moreover, unless noted otherwise herein, operations of each vehicle 102 are similar to those of the vehicle 101. As one difference, as noted above, the computer 105 may execute programming to identify one or more OBD tests to be performed by the following vehicles 102 in addition to the vehicle 101, and/or may execute programming to specify a time when the vehicle(s) 102 perform the one or more OBD tests.

The vehicle 101 and the vehicles 102 may travel in a platoon, as explained above. Accordingly, the vehicle 101 computer 105 may include programming to provide, and the vehicle 102 computers 106 may include programming to receive and act upon, messages concerning travel of the platoon and/or recommended and/or required actions by one or more of the vehicles 102, e.g., relating to speed, steering angle, braking, etc. of the vehicles 102. Various techniques such as are known may be employed for the vehicles 101, 102 to travel in a platoon.

In each of the vehicles 101, 102, the computer 105, 106 receives sensor 115, 116 data and monitors for the prerequisite conditions for the OBD test. However, each vehicle 102 computer 106 may be programmed to override entry condition requirements or the like and instead follow instructions in a message from a lead vehicle 101, e.g., based on a determination by the computer 106. The computer 105 may initiate the OBD test when the conditions are met and may monitor the conditions throughout the ODB test. The computer 105 may abort the OBD test, e.g., if conditions change. The vehicle 102 computer 106 may at least in part determine to initiate the OBD test based on the vehicle 101 computer 105.

In one example, the vehicles 101, 102 may be travelling on a hilly or mountainous roadway, e.g., a roadway having altitude changes of plus or minus two-hundred and fifty meters over the course of five kilometers. The lead vehicle 101 computer 105 could be programmed to recognize that conditions for conducting a particular OBD test will be met when a platoon including the vehicles 101, 102 travels 500 meters, because at that location the vehicles 101, 102 will be at an altitude appropriate (low enough or high enough) for the test. Accordingly, the computer 105 could cause a message to be sent to vehicle 102 computers 106 specifying a time to begin the OBD test, the specified time being a time at which the computer 105 has determined that each of the vehicles 101, 102 will be at the location at which the test can be initiated. The computer 105 may further execute programming to initiate the test in the vehicle 101 at the specified time.

In another example, the vehicles 101, 102 could be traveling at a speed below a speed needed to conduct a particular OBD test. The lead vehicle 101 could detect that traffic ahead is clearing, e.g., that vehicles ahead of the lead vehicle 101 are moving at a speed above the threshold speed needed for the particular OBD test. Alternatively or additionally, the lead vehicle 101 could use information from a navigation system, e.g., connected to a remote server via a cellular network or the like, to determine that traffic speeds on an upcoming portion of a roadway are likely to exceed the threshold for the OBD test. In any event, upon such determination, the lead vehicle 101 could instruct the following vehicles 102 to conduct the test at a specified time that is a time at which the computer 105 has estimated the vehicles 101, 102 are likely to be traveling above the speed threshold.

For further example, the vehicle 101 may be traveling on a road with changing surface conditions. The vehicle 101 may generate a surface topography of the road and use the topography to instruct the vehicles 102 to conduct OBD tests. Specifically, the vehicle 101 may determine the time at which the vehicles 102 will travel over specific road topographies, e.g., a dry portion of the road, a wet portion of the road, etc., and instruct the vehicles 102 to conduct the OBD tests if road conditions are satisfied.

In an additional and/or alternative implementation in one or more of the above examples, the computer 105 could instruct the following vehicle 102 computers 106 to conduct an OBD test even if the prerequisite conditions that would ordinarily be required by the computer 106 are not met. For example, upon determining that the vehicles 101, 102 are approaching an acceptable altitude, speed, etc., for a test, the computer 105 could instruct, e.g., via a V2V message, the computers 106 to execute a particular test at a specified time (which could be upon receipt of the message) regardless of whether the computer 106 determines that test conditions are met, and/or the computer 106 could be programmed to follow test instructions from the lead vehicle 101 computer 105 without regard to, and possibly without evaluating, conditions for the test in the vehicle 102.

Example Process

Figure 2:
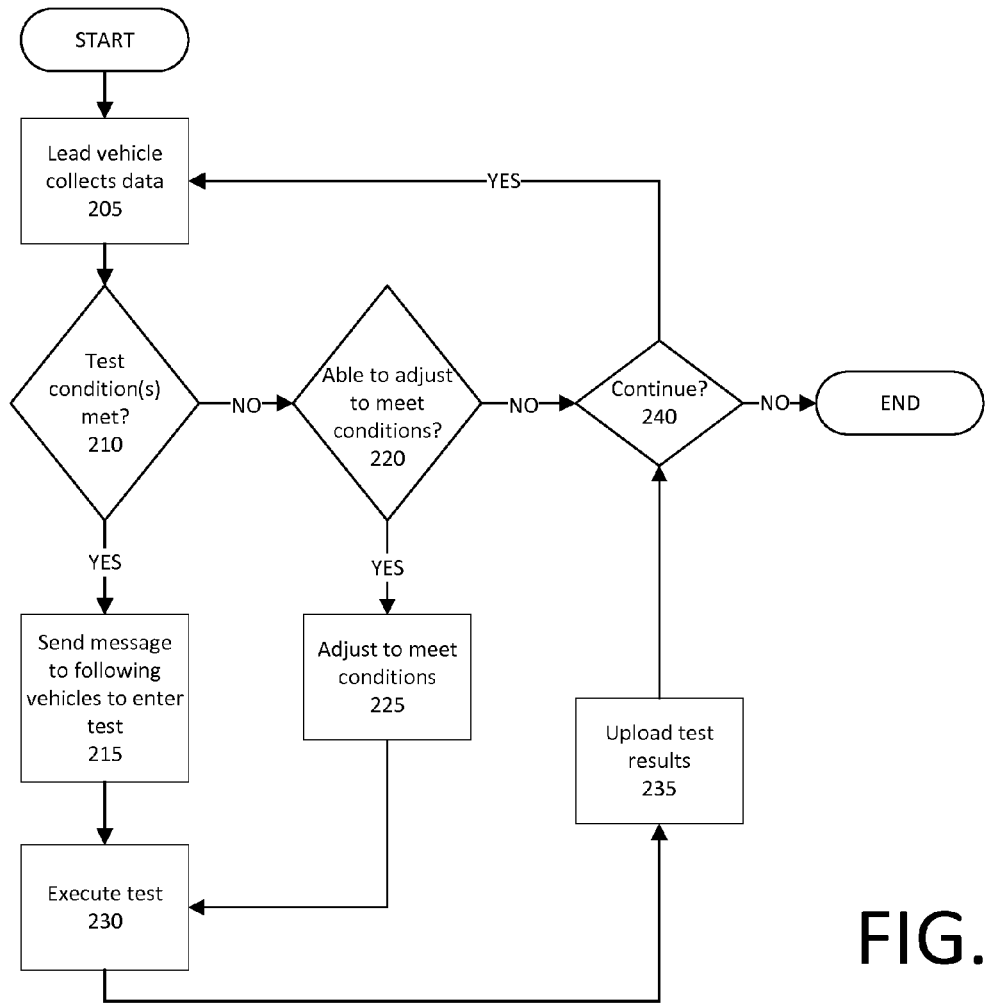
FIG. 2 is a diagram of an example process for OBD testing in a vehicle platoon.

FIG. 2 is a diagram of an example process 200 for testing vehicle components, e.g., OBD testing, in platoon that includes a lead vehicle 101 and one or more following vehicles 102. The process 200 is described in the context of OBD data and OBD testing by way of example and not limitation; the process 200 could apply to other kinds of data and tests. Steps of the example process 200 are typically performed in the lead vehicle 101 according to programming executed in the computer 105. However, as will be clear from context, at least some parts of the process 200 may be performed in at least some of the following vehicles 102 computers 106 as described herein below.

The process 200 begins in a block 205 in which the lead vehicle 101 computer 105 collects data. The collected data may be received via the bus 125 in a known manner from a variety of sources, e.g., vehicle electronic control units (ECUs), sensors 115, and/or other vehicle 101 components as may be known. The collected data typically includes measurements that may be compared to prerequisite conditions for performing one or more OBD tests, as is known. Examples of collected data from vehicle 101 components such as ECUs, sensors 115, or the like, include data relating to an environment in which the vehicle 101 is travelling (e.g., ambient light level, presence or absence of precipitation, outside air temperature, etc.), vehicle 101 operating parameters (e.g., vehicle 101 speed, heading, steering angle, activation of brakes, throttle setting, etc.), information concerning upcoming terrain from sensors 115 and/or a navigation system (e.g., rough road, change in elevation, curve, etc.).

From such data, the computer 105 may be programmed to predict conditions to be encountered during a duration of one or more OBD tests of the vehicles 101, 102, e.g., the vehicles 101, 102 planned route, expected traffic density, outside air temperature, road surface conditions, road friction, vehicle 101, 102 speed, etc. Further, the computer 105 typically stores information about one or more OBD tests to be performed in the vehicle 101, e.g., whether the particular OBD test is due to be performed, a frequency according to which a particular OBD test is performed, etc.

Next, in a block 210, the vehicle 101 computer 105 identifies an OBD test to be performed at a particular time, e.g., as is known for conducting OBD tests in vehicles 101, 102, and then determines whether one or more prerequisite conditions for the specified OBD test, e.g., a test indicated as required at a specified time, or within a specified time window according to data stored in a memory of the computer 105, are met. Typically, the computer 105 is programmed to determine if conditions are presently, or are predicted to be at a predetermined future time, e.g., in 30 seconds, 60 seconds, etc., met in the vehicle 101 for a particular test. The computer 105 may determine whether the test conditions are met in a known manner, e.g., by comparing data received via the bus 125 such as described above to the prerequisite conditions, e.g., stored in the computer 105 memory. Moreover, the computer 105 is generally programmed to determine if the one or more prerequisite conditions for a test are met in one or more following vehicles 102. For example, the computer 105 may be programmed to determine, based on a speed and/or following distance of the following vehicle(s) 102, whether conditions for the test are predicted to be met in some or all of the following vehicle(s) 102, e.g., at least a majority of the following vehicles 102, at a same time as conditions are met in the lead vehicle 101. If the received data indicate that prerequisite conditions for a test are met and/or indicate that the conditions will be met for an expected duration (e.g., as stored in a memory of the computer 105) of the particular OBD test in the lead vehicle 101 and in the following vehicle(s) 102, such as a majority of the vehicles 101, 102 in a platoon, then a block 215 is executed next. Otherwise, the process 200 proceeds to a block 220.

Next, in the block 215, the vehicle 101 computer 105 sends a message to its vehicle(s) 102 to perform the specified OBD test from the block 210. Alternatively, in lieu of the vehicle 101 computer 105 determining that the following vehicles 102 may actuate the one or more OBD tests and sending the message to the vehicles 102 computer 106 to actuate the one or more OBD tests, the vehicle 101 computer 105 may send collected data to the following vehicles 102. The vehicles 102 computers 106, upon receipt of the collected data, may determine to actuate the one or more OBD tests based on the collected data from the vehicle 101 computer 105 instead of or in addition to data collected by the vehicle 102 computer 106. Further, the vehicle 101 computer 105 may selectively send collected data to the vehicle 102 computers 106, e.g., when the computer 105 has determined that conditions are or will be met for a test, and may in this way determine at least in part a time and/or location of OBD tests in the following vehicles 102.

In the block 220, reached if test conditions are not met in one or more vehicles 101, 102, the vehicle 101 computer 105 attempts to identify adjustments to operations of one or more platoon vehicles 101, 102 that would allow the test specified in the block 210 to be performed. For example, a change in speed, acceleration, active suspension, etc., could allow a test to be performed.

Following the block 220, in a block 225, the computer 105 actuates a message, e.g., a vehicle-to-vehicle message, to following vehicle 102 computers 106 to make adjustments to operations, e.g., to adjust a speed, acceleration, active suspension, etc. For example, because the vehicles 102 follow the vehicle 101 in the platoon, testing in the vehicles 102 could be time-shifted, e.g., delayed for a specified period of time, e.g., one second, five seconds, etc., relative to a time of a test or tests in the vehicle 101. Therefore, the message sent from the vehicle 101 computer to the vehicles 102 computers 106 may include a time and/or the location (e.g., specific global positioning system coordinates) at which the vehicle 102 computer 106 is to actuate the one or more OBD tests.

In a block 230, which may follow either of the blocks 215, 225, the vehicles 101, 102 execute the one or more OBD tests for which, as described with respect to the block 210, it has been determined that (a) prerequisite condition(s) are met, and/or each vehicle 101, 102 executes an OBD test (or not) according to a determination made by the respective vehicle 101, 102 computer 105, 106 based at least in part on the data collect by and provided from the lead vehicle 101 computer 105. During the execution of the one or more OBD tests, at least one of the vehicle 101 computer 105 and the vehicles 102 computers 106 monitor whether the test conditions continue to be met. If the conditions are not met the vehicle 101 computer 105 and/or the following vehicle 102 computers 106 may abort the OBD test. For example, a computer 105, 106, upon determining that test conditions are no longer met, may terminate the test in the computer's 105, 106 vehicle 101, 102 and also send a vehicle-to-vehicle message other vehicles 101, 102 in the platoon indicating to abort the test.

Next, in a block 235, the vehicles 101, 102 store the test results, e.g. in a memory of computer 105, 106; test result data may also be provided externally to a vehicle 101, 102 in a conventional manner, e.g., via an OBD port such as is known and/or may be uploaded to an external data store, e.g., a server access via a wireless, cellular, etc., network. Additionally, as is known, a computer 105, 106 may activate one or more notifications to an operator of the vehicle 101 indicating that the OBD test has discovered a problem, e.g., by activating a check engine light on the dashboard, etc., via a human-machine-interface (HMI), etc.

Next, after the block 235, or following from the block 220, in the block 240, the vehicle 101 computer 105 determines whether the process 200 should continue. For example, the process 200 may end if the operator of the vehicle 101 turns off the function of process 200, if the vehicle is switched off, etc. In any case, if the process 200 should not continue the process 200 ends following the block 240. Otherwise, the process 200 returns to the block 205.

Example Scenario

To provide an illustration of the foregoing principles, one OBD test that could be carried out in a platoon of vehicles 101, 102 as described herein is a fuel tank leak or evaporation test. For example, an OBD test is provided to determine whether a fuel tank has a hole of as small as 0.04" or greater. The test is known as a "cruise test," because it is executed when a vehicle is cruising on a roadway. The test uses a vacuum to evacuate a fuel tank. To conduct the test, certain entry conditions must be satisfied, including (to provide examples and not a complete list) an ambient temperature between 45 and 95 degrees Fahrenheit, an altitude of less than 8500 feet, and a vehicle fuel level between 15% and 85% of total capacity.

A lead vehicle 101 computer 105 memory could indicate that the fuel tank leak test is to be conducted, e.g., based on a comparison of a current time to a time stored in a memory of the computer 105 and associated with the fuel tank leak test. The computer 105 could determine that various entry conditions were met, e.g., that ambient temperature and altitude conditions were met, etc. The computer 105 could then send a message to computers 106 in following vehicles 102 to conduct the fuel tank leak test at a specified time.

Further, as described above, it is possible that the computer 105 could instruct the vehicles 102 to adjust operating conditions, e.g., increase speed to above 25 miles per hour, maintain an acceleration below a threshold, etc., prior to beginning the test and/or to maintain such conditions for a duration of the test. Yet further, the computer 105 could order the test for all vehicles 101, 102 in the platoon in advance of conditions being met. For example, the vehicle 101 could receive sensor 115 data indicating that traffic ahead was travelling at speeds over 25 miles per hour, even though the platoon was currently travelling at a slower speed. To take another example, navigation data and/or sensor 115 data could indicate that the platoon, although currently over 8500 feet above sea level, would be descending to an altitude below that threshold in one minute. Accordingly, the computer 105 could instruct the vehicles 102 to begin the fuel tank leak test, and could conduct the test in the vehicle 101, at an earlier time in anticipation of conditions being met for the majority of the duration of the test.

To continue this example, the fuel tank leak test, like most OBD tests, is associated with abort conditions, i.e., conditions that, upon arising during a test, indicate that the test should be aborted. For example, vehicle altitude greater than 8500 feet, ambient temperature below 45 degrees Fahrenheit, etc., are abort conditions for the fuel tank leak test. If such condition or conditions arise during the test being carried out by the vehicles 101, 102 for one or more of the vehicles 101, 102, the computer 105 could instruct all of the vehicles 101, 102 in the platoon to abort the test.

CONCLUSION

Computing devices such as those discussed herein generally each include instructions executable by one or more computing devices such as those identified above, and for carrying out blocks or steps of processes described above. Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in a computing device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of systems and/or processes herein are provided for the purpose of illustrating certain embodiments, and should in no way be construed so as to limit the disclosed subject matter.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non-provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

What is claimed is:

1. A method, comprising:
   determining, in a lead vehicle, that one or more conditions for initiating a diagnostic test are met;
   sending a vehicle-to-vehicle message to one or more following vehicles, the message providing data to indicate to each following vehicle to perform the test at a specified time determined by the lead vehicle; and
   performing the test in the lead vehicle at the specified time.

2. The method of claim 1, further comprising providing, from the lead vehicle, operating instructions to the one or more following vehicles.

3. The method of claim 1, wherein the data include an instruction to perform the test at the specified time.

4. The method of claim 1, wherein the data include an instruction to indicate to at least one of the following vehicles to modify the operations of the at least one of the following vehicles and an instruction to the at least one of the following vehicles to modify a testing protocol of the diagnostic test.

5. The method of claim 1, wherein the data include information about a roadway ahead of the lead vehicle.

6. The method of claim 1, wherein the data include a lead vehicle sensor measurement.

7. The method of claim 1, wherein the data include a lead vehicle sensor measurement.

8. The method of claim 1, wherein the conditions include at least one of an ambient temperature, a fuel volume, a vehicle speed, and a vehicle acceleration.

9. The method of claim 1, further comprising sending a second vehicle-to-vehicle message to the one or more following vehicles from the lead vehicle instructing the one or more following vehicles to suspend the test.

10. The method of claim 1, wherein the diagnostic test is an onboard diagnostic (OBD) test.

11. A system, comprising:
a vehicle computer comprising a processor and a memory, the memory storing instructions executable by the processor to:
  determine, in a lead vehicle, that one or more conditions for initiating a diagnostic test are met;
  send a vehicle-to-vehicle message to a plurality of following vehicles, the message providing data to indicate to each following vehicle to perform the test at a specified time determined by the lead vehicle; and
  perform the test in the lead vehicle at said time.

12. The system of claim 11, wherein the computer is further programmed to provide, from the lead vehicle, operating instructions to the plurality.

13. The system of claim 11, wherein the data includes an instruction to perform the test at said time.

14. The system of claim 11, wherein the data includes an instruction to at least one of the plurality to modify the operations of the at least one of the plurality and an instruction to the at least one of the plurality to modify a testing protocol of the diagnostic test.

15. The system of claim 11, wherein the data include information about a roadway ahead of the lead vehicle.

16. The system of claim 11, wherein the computer is further programmed to receive test results from the plurality.

17. The system of claim 11, wherein the data include a lead vehicle sensor measurement.

18. The system of claim 11, wherein the conditions include at least one of an ambient temperature, a fuel volume, a vehicle speed, and a vehicle acceleration.

19. The system of claim 11, wherein the computer is further programmed to send a second vehicle-to-vehicle message to the plurality instructing the plurality to suspend the test.

20. The system of claim 11, wherein the diagnostic test is an onboard diagnostic (OBD) test.

* * * * *